(12) United States Patent
Nielsen et al.

(10) Patent No.: US 11,780,570 B2
(45) Date of Patent: Oct. 10, 2023

(54) UNMANNED AERIAL VEHICLE WITH OBJECT DETECTION PROPELLER STOPPAGE

(71) Applicants: Simon Nielsen, Beverly Hills, CA (US); Russell Douglas Patton, Playa Vista, CA (US)

(72) Inventors: Simon Nielsen, Beverly Hills, CA (US); Russell Douglas Patton, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/105,551

(22) Filed: Feb. 3, 2023

(65) Prior Publication Data
US 2023/0174223 A1    Jun. 8, 2023

Related U.S. Application Data

(63) Continuation of application No. 16/825,705, filed on Mar. 20, 2020, now Pat. No. 11,572,160.

(51) Int. Cl.
| | | |
|---|---|---|
| *B64C 27/00* | (2006.01) | |
| *B64C 39/02* | (2023.01) | |
| *B64D 47/02* | (2006.01) | |
| *G01V 8/12* | (2006.01) | |
| *B64C 27/20* | (2023.01) | |
| *B64U 10/13* | (2023.01) | |
| *B64U 30/20* | (2023.01) | |

(52) U.S. Cl.
CPC .......... *B64C 27/006* (2013.01); *B64C 27/20* (2013.01); *B64C 39/024* (2013.01); *B64D 47/02* (2013.01); *G01V 8/12* (2013.01); *B64U 10/13* (2023.01); *B64U 30/20* (2023.01)

(58) Field of Classification Search
CPC ..... B64C 27/006; B64C 27/20; B64C 39/024; B64C 2201/027; B64C 2201/108; B64D 47/02; G01V 8/12
See application file for complete search history.

(56) References Cited

U.S. PATENT DOCUMENTS

| | | | |
|---|---|---|---|
| 6,903,327 B1 * | 6/2005 | Appleyard | B21D 55/00 250/221 |
| 11,572,160 B1 | 2/2023 | Nielsen et al. | |
| 2006/0006315 A1 | 1/2006 | Appleyard | |
| 2016/0039529 A1 * | 2/2016 | Buchmueller | F16D 43/00 244/65 |

* cited by examiner

*Primary Examiner* — Justin M Benedik
(74) *Attorney, Agent, or Firm* — Culhane Meadows PLLC; Stephen J. Weed (57) ABSTRACT

Systems, devices, and methods for stopping the rotation of propellers used in unmanned aerial vehicles (UAV) such as drones are disclosed. The propellers are stopped in response to detecting when beams of light adjacent the propellers are blocked.

20 Claims, 6 Drawing Sheets

UNMANNED AERIAL VEHICLE WITH OBJECT DETECTION PROPELLER STOPPAGE

CROSS-REFERENCE TO RELATED APPLICATIONS

This application is a Continuation of U.S. application Ser. No. 16/825,705 filed on Mar. 20, 2020, the contents of which are incorporated fully herein by reference.

TECHNICAL FIELD

The present subject matter relates to safety features for unmanned aerial vehicles such as drones and, more specifically, to systems and methods for stopping propeller rotation in response to detecting objects such as fingers.

BACKGROUND

Unmanned aerial vehicles (UAV) such as drones are aircraft without a human pilot aboard. UAVs have propellers that rotate at a high rate of speed (e.g., 8000 RPM) to generate the lift necessary to fly. Touching a propeller during operation can cause injury and/or damage the UAV. Conventional UAVs use propeller guards/shrouds to protect the public and the propellers.

BRIEF DESCRIPTION OF THE DRAWINGS

The drawing figures depict non-limit examples. In the figures, like reference numerals refer to the same or similar elements. When more than one of the same or similar elements are depicted, a common reference number may be used with a letter designation corresponding to a respective element. When the elements are referred to collectively or a non-specific element is referenced, the letter designation may be omitted. In the drawings.

DETAILED DESCRIPTION

In an example, systems, devices, and methods are provided for stopping the rotation of propellers used in unmanned aerial vehicles (UAV) such as drones. The propellers are stopped in response to detecting when beams of light adjacent the propellers are blocked. When objects such as human fingers block the beams of light, the propellers are stopped to prevent injury to the human and damage to the propeller. Stopping the propellers responsive to light blockage enables use of lighter and more open propeller shrouds, e.g., shrouds with bigger holes that allow more efficient airflow, thereby improving efficiency, weight, and noise.

In the following description, numerous specific details are set forth by way of examples in order to provide a thorough understanding of the relevant teachings. How to practice the present teachings, however, should be apparent to those skilled in the art without the need for such details. In other instances, well-known methods, procedures, components, and circuitry are described at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the UAV, associated components and any complete devices, are given by way of example only, for illustration and discussion purposes. In operation, for particular programming, the UAV may be oriented in any other direction suitable to the particular application of the UAV, for example up, down, sideways, or any other orientation. Also, to the extent used herein, any directional term, such as front, rear, inward, outward, towards, left, right, lateral, longitudinal, up, down, upper, lower, top, bottom and side, are used by way of example only, and are not limiting as to direction or orientation of any UAV or component of a UAV constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to examples illustrated in the accompanying drawings and discussed below.

Figure 1A:
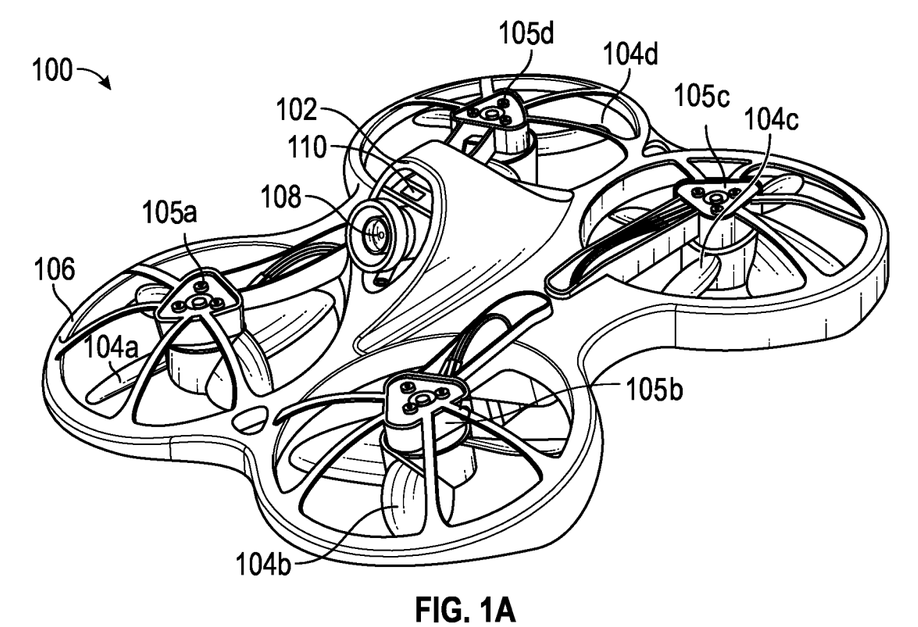
FIG. 1A is a top perspective view of an example UAV having a light detection system for stopping propeller rotation.

FIG. 1A is block diagram of an example UAV 100. The UAV 100 includes housing 102. The housing 102 supports a propeller assembly including one or more propellers 104 (propellers 104a-d in the illustrated examples) and respective motors 105 (motors 105a-d in the illustrated examples) that turn the propellers 104.

Figure 1B:
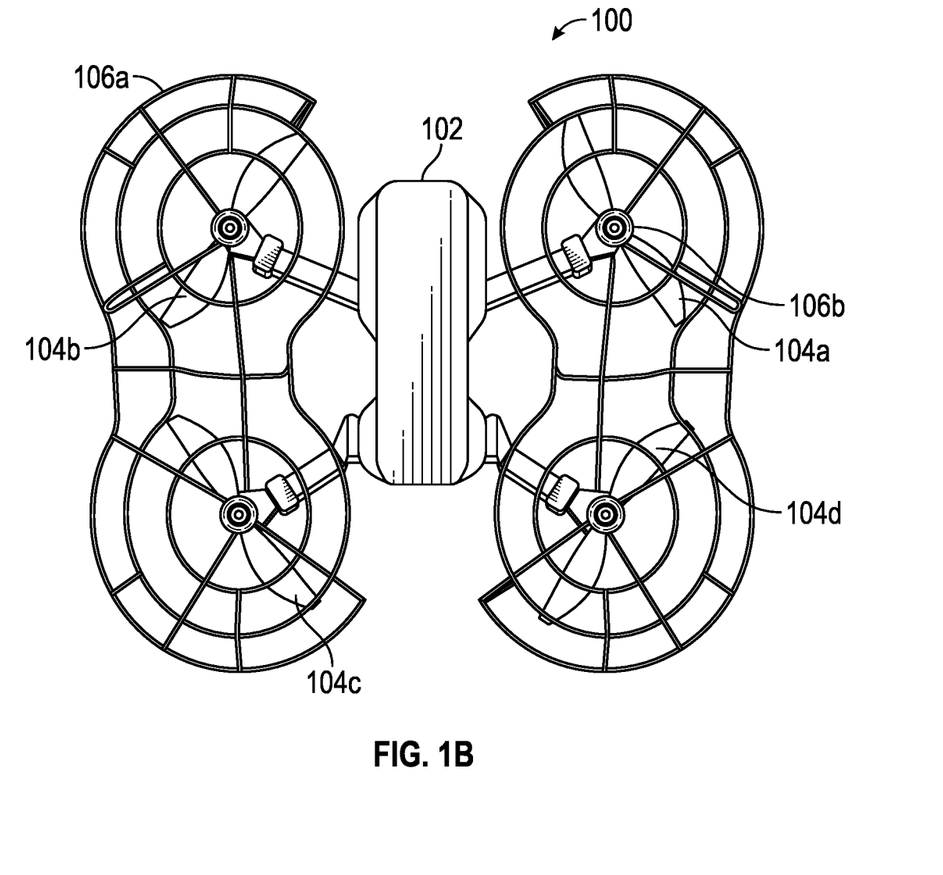
FIG. 1B is a top view of another example UAV having a light detection system for stopping propeller rotation.
Figure 1C:
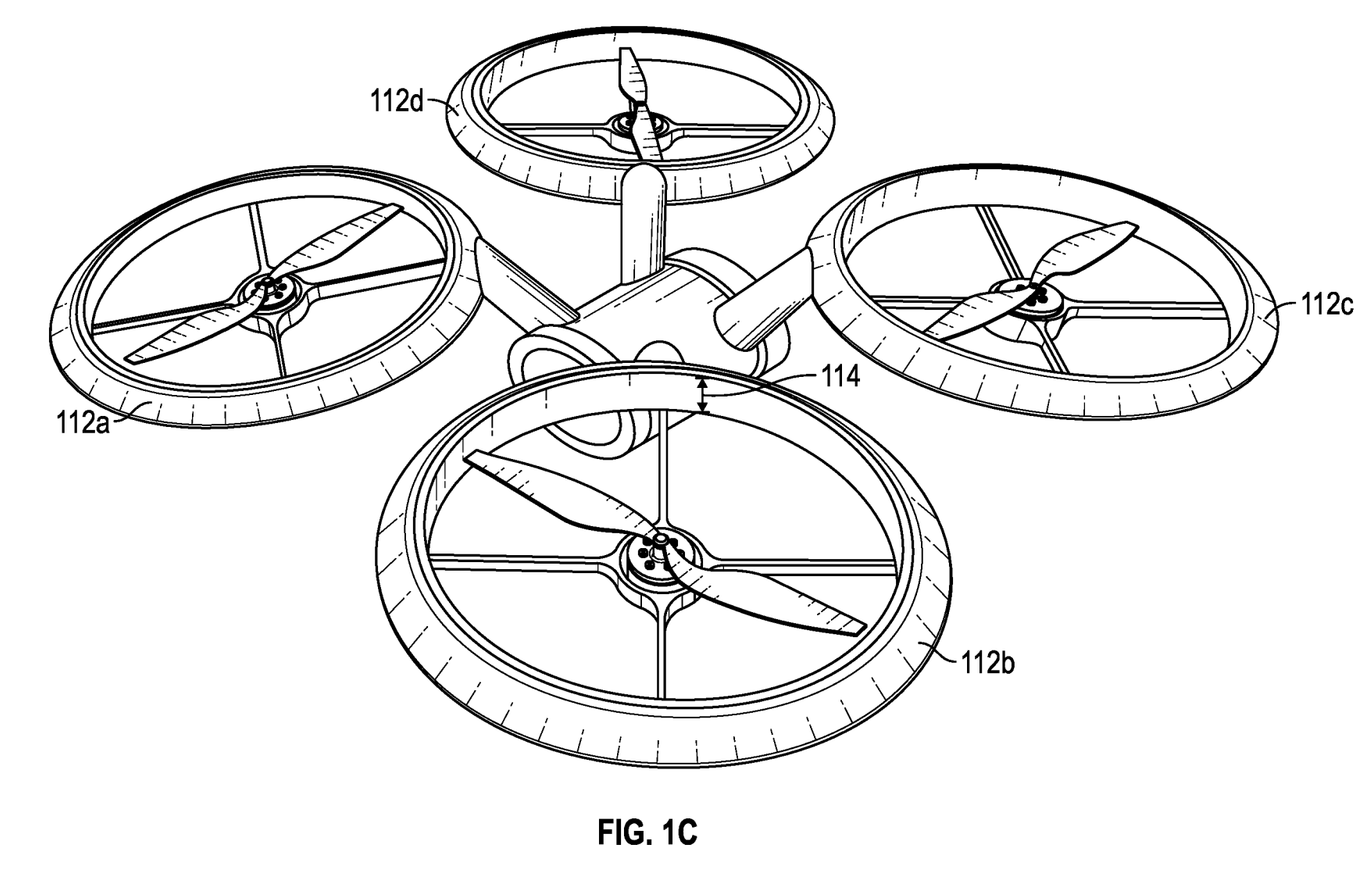
FIG. 1C is a top perspective view of another example UAV having a light detection system for stopping propeller rotation.

The housing 102 includes a main body 111 and a propeller shroud 106 at least partially surrounding the propellers 104. The propeller shroud 106 may be integrally formed with the main body 111 as illustrated in FIG. 1A or may be distinct from the main body 111 as illustrated in FIG. 1B (which depicts two distinct propeller shrouds; a first propeller shroud 106a at least partially surrounding propellers 104b and 104c and a second propeller shroud 106 at least partially surrounding propellers 104a and 104d). The propeller shrouds 106 may include ducts (ducts 112a-d) surrounding each of the propellers 104 as illustrated in FIG. 1C. Each duct 112 has a depth 114 that is greater than the height of the propeller it surrounds, with a top opening above the propeller and a bottom opening below the propeller. A light detection system, described in further detail below, is attached to or integrated into the propeller shrouds 106 or ducts 112.

The illustrated UAV 100 additionally includes a projector 110 and an imager 108. The imager 108 is configured to capture images and the projector 110 is configured to project images onto a projection surface.

Figure 2A:
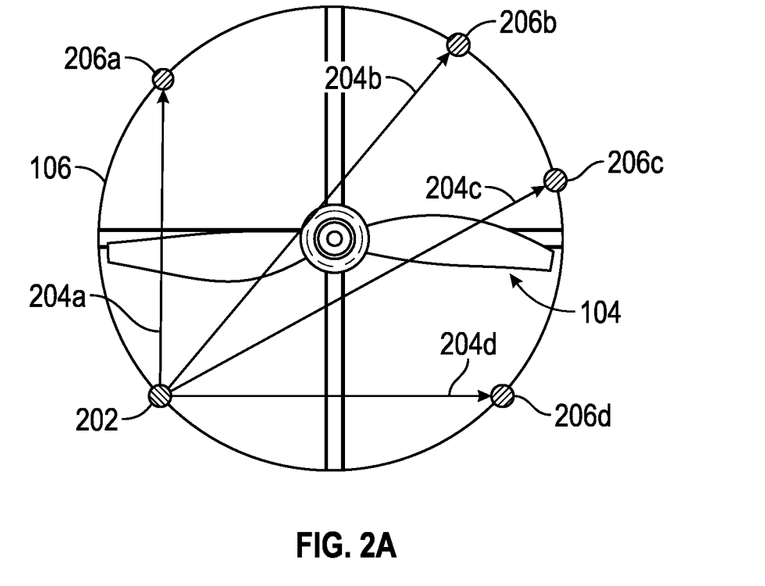
FIG. 2A is an illustration of one example of a light detection system of sensing an object adjacent a propeller.

FIG. 2A depicts one example of a light detection system 200 for incorporation in a shroud 106 surrounding a propeller 104. The light detection system illustrated in FIG. 2A includes an emitter 202 and multiple detectors (detectors 206a-d) positioned on a surface of the shroud 106. The emitter 202 emits a first beam of light 204a toward a first detector 206a, a second beam of light 204b toward a second detector 206b, a third beam of light 204c toward a third detector 206c, and a fourth beam of light 204d toward a fourth detector 206d. In accordance with this example, if one or more detectors 206 fails to detect a beam of light 204, the propeller 104 is stopped (e.g., by cutting power or actively applying reverse torque to the propeller assembly).

The emitter 202 may be an infrared emitter that emits collimated beams of light (e.g., a laser) toward detectors 206 that are configured to detect the beams of light emitted by the emitter 202. The beams of light may have a cross section suitable to detect objects of interest such as a finger, but not, for example, dust/sand particles. In one example, the beams of light have a cross section of approximately 1-2 centimeters. The detectors 206 are configured to output a signal indicating whether they have received a beam of light (e.g., a low value such as logic 0 when detected and a high value such as logic 1 when not detected, or vice versa).

In the illustrated example, one emitter 202 is configured to produce multiple beams of light. In another example, other emitters may be collocated with the emitter 202 or positioned at other locations around the shroud 106 in order to provide suitable coverage of the propeller 104 to prevent objects in the vicinity of the propeller 104 such as a finger to go undetected.

In one example, the emitter 202 may encode the beams of the light and the detectors 206 (or a processor coupled thereto) may be configured to decode those beams of light. In accordance with this example, signals that are output indicating whether a beam of light are dependent on the encoding/decoding (e.g., a low value such a logic 0 when a properly encoded beam is detected and a high value such as logic 1 when no light beam is detected or a light beam that is not properly encoded, or vice versa). Encoding the light beams guards against interference with the light detection system 200 by external light sources.

The emitter 202 and the detectors 206 are positioned such that the light beams 204 are adjacent (i.e., near; e.g., within a few centimeters) the propellers. In one example, the emitters 202 and detectors 206 are positioned on the shroud 106 on one side of the propeller 104 to produce beams of light for use in detecting objects approaching from one side of the propeller 104 (e.g., a bottom of a shroud or a bottom opening of a duct during normal operation of a UAV). In another example, the emitters 202 and detectors 206 are positioned on the shroud 106 on both sides of the propeller 104 to produce beams of light for use in detecting objects approaching from both sides of the propeller 104 (e.g., top/bottom of a shroud or top/bottom openings of a duct during normal operation of a UAV). In yet another example, emitters and detectors are positioned on the shroud to produce beams of light outside the reach of the propeller that passes the tips of the propeller (e.g., an emitter on a top/bottom of a shroud or top/bottom openings of a duct and a detector on a bottom/top of a shroud or bottom/top openings of a duct during normal operation of a UAV).

Figure 2B:
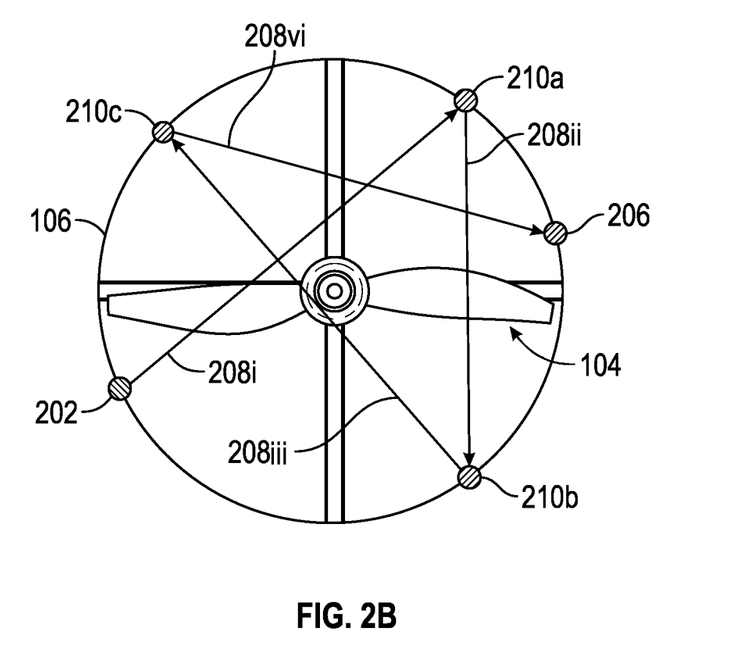
FIG. 2B is an illustration of another example of a light detection system of sensing an object adjacent a propeller.

FIG. 2B depicts another example of a light detection system 200 for incorporation in a shroud 106 surrounding a propeller 104. The light detection system illustrated in FIG. 2B includes an emitter 202, a detector 206, and multiple mirrors (mirrors 210a-c). The emitter 202 emits a first path beam of light 208i in a first direction, a first mirror 210a receives the first path beam of light 208i and redirects it as a second path beam of light 208ii in a second direction, a second mirror 210b receives the second path beam of light 208ii and redirects it as a third path beam of light 208iii in a third direction, a third mirror 210c receives the third path beam of light 208iii and redirects it as a fourth path beam of light 208iv in a fourth direction, and the detector 206 receives the fourth path beam of light 208iv. In accordance with this example, if the detector 206 fails to detect a beam of light 204 (resulting from blockage of any one or more of the beams of light 208i-iv), the propeller 104 is stopped (e.g., by cutting power or actively applying reverse torque to the propeller assembly).

The emitter 202, detector 208, and mirrors 210 may be positioned as described above with reference to FIG. 2A. Additionally, the emitter 202 and detector 208 may be the same or similar to those described above with reference to FIG. 2A. Through the use of mirrors 210, fewer emitters 202 and/or 208 detectors may be used to provide suitable coverage surrounding the propeller 104. For example, in contrast to the system depicted in FIG. 2A, multiple paths of light beams may be formed by a single emitter emitting light in a single direction.

Figure 3:
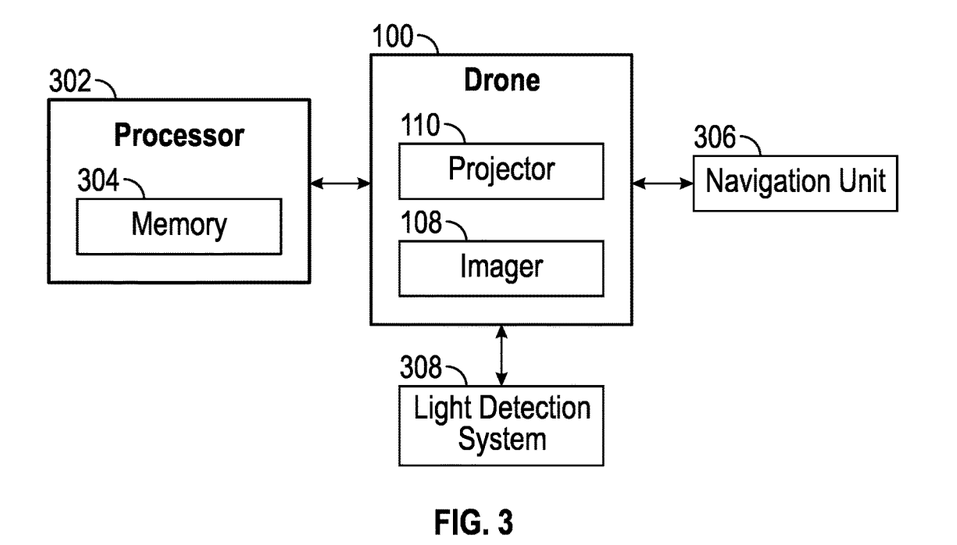
FIG. 3 is a block diagram of an example UAV system with light detection propeller stoppage.

FIG. 3 depicts components of a safety system 300 including the UAV 100. The UAV 100 (drone in the illustrated example) includes the imager 108, the projector 110, and one or more light detection systems 308 (e.g., light detection systems 200 on the shrouds of the UAV 100).

The UAV 100 additionally includes a navigation unit 306. The navigation unit 306 is configured to determine a location of the UAV 100. The navigation unit 306 may also determine an orientation of the UAV 100. The orientation may include but is not limited to left, right, center, off-centered, west, east, north south, up, down, degrees thereof, etc. The navigation unit 306 may be a global positioning system (GPS) such as a real time kinematic (RTK) GPS. The RTK GPS may provide a real-time position accuracy of the UAV 100 at a centimeter level. The UAV 100 may support the navigation unit 306 or the navigation unit 306 may be a separate component coupled to the UAV 100.

The UAV 100 also includes a processor 302 and a memory 304 coupled to the UAV 100 and the navigation unit 306. The memory 304 stores instructions for execution by the processor 302 to perform one or more of the functions described herein. The processor 302 is coupled to the memory 304. The processor 302 is configured to perform functions, which are described in further detail below, for stopping the propellers in response to detecting objects adjacent the propellers 104. The UAV 100 support the processor 302 and memory 304.

Figure 4:
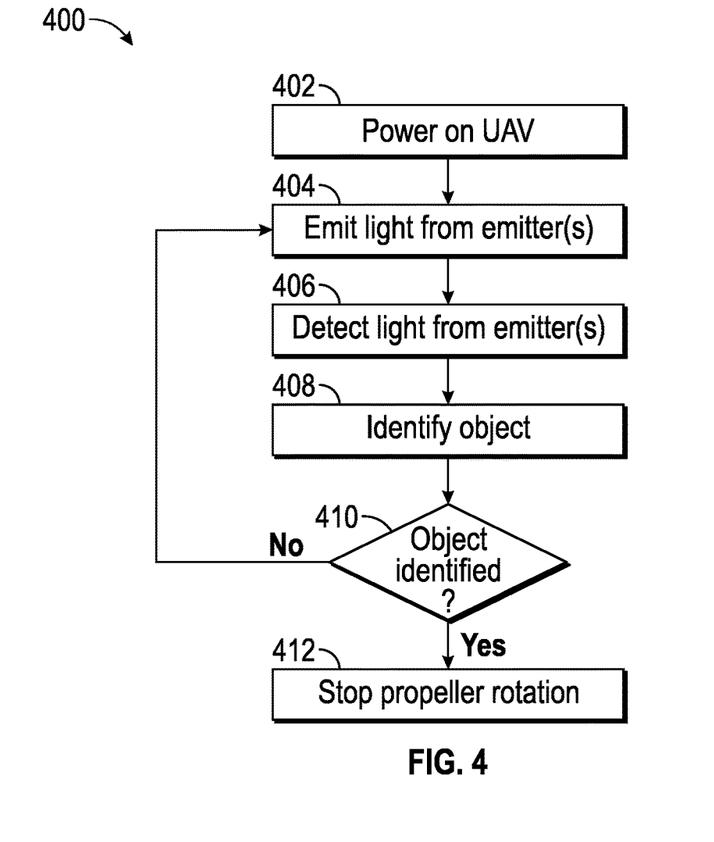
FIG. 4 is a flowchart illustrating an example method for stopping propeller rotation responsive to an object blocking a beam of light.

FIG. 4 is flow chart 400 illustrating an example method for stopping the propeller(s) of a UAV 100. In one example, the UAV 100 of FIG. 1 implements the steps of the flow chart 400. One of skill in the art will understand other suitable components for implementing the method of flow chart 400 from the description herein.

At block 402, power on the UAV. The UAV 100 may be powered on by pressing a button (not shown) on an exterior surface of the UAV 100. In one example, powering on the UAV 100 initializes a start-up sequence for controlling the drone using computer vision (CV), artificial intelligence, and/or predetermined flight paths stored in memory. In another example, powering on the drone may establish a connection with an external controller for controlling operation of the drone (including an initial start-up sequence in which the propellers are brought up to speed for lift off).

At block 404, emit beams of light that pass adjacent the propellers. The emitter(s) 202, under control of the processor 302, emits beams of light 204/208 that pass adjacent propellers 104. In one example, the beams of light are encoded by the processor 302 to enable differentiation from other beams of light. The beams of light may be redirected by mirrors 210 that redirect light passing adjacent a first portion of the propeller 104 back toward another portion of the propeller 104.

At block 406, detect beams of light received from the emitter(s) (either directly or by way of one or more mirrors). The detector(s) 206, under control of the processor 302, detects beams of light 204/208 from emitter(s) 202 after they pass adjacent propellers 104. A detector 206 may receive a beam of light directly from an emitter 202 or by way of one or more mirrors 210. In examples where the beams of light are encoded by the processor 302 to enable differentiation from other beams of light, the processor 302 decodes the beams of light to ensure the received light is the light that is expected.

At block 408, identify an object adjacent a propeller. The processor 302 identifies an object if one or more detectors 206 fails to detect a light beam. In examples where the light beam is encoded, the processor 302 identifies an object if one or more detectors 206 fails to detect a light beam or if the encoding of the detected light beam does not match the encoding expected by the processor 302.

At decision block 410, a decision is made regarding whether an object was identified. If an object is not identified, processing proceeds at block 404 and the process repeats until the drone is powered off. If an object is identified, processing proceeds at block 412.

At block 412, the propeller rotation is stopped. The processor 302 stops the propellers 104 responsive to the light detection system 308 indicating absence of a beam of light from an emitter reaching a detector. The processor 302 may stop propeller rotation by actively applying a reverse torque to slow/stop the propellers with the motor(s) 105 of the propeller assembly(ies) or may cut power to the motor(s), e.g., via an electro-mechanical switch positioned in a power supply line for the motor(s) 105.

Figure 5:
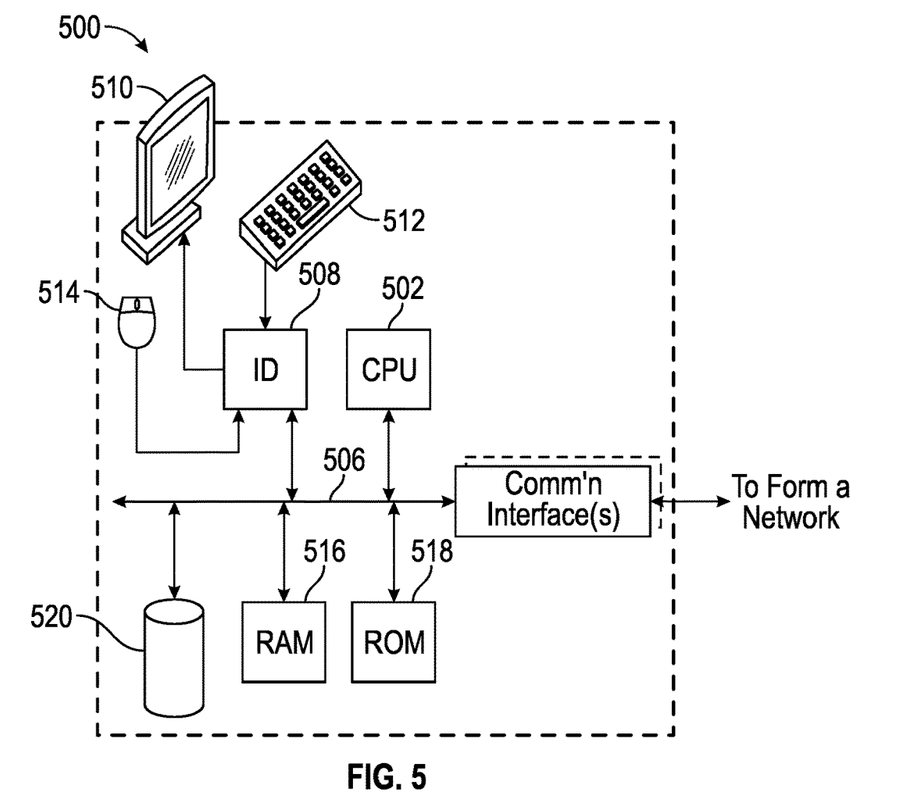
FIG. 5 is a functional block diagram illustrating a general-purpose computer hardware platform configured to implement the functional examples described with respect to FIGS. 1-4.
Figure 6:
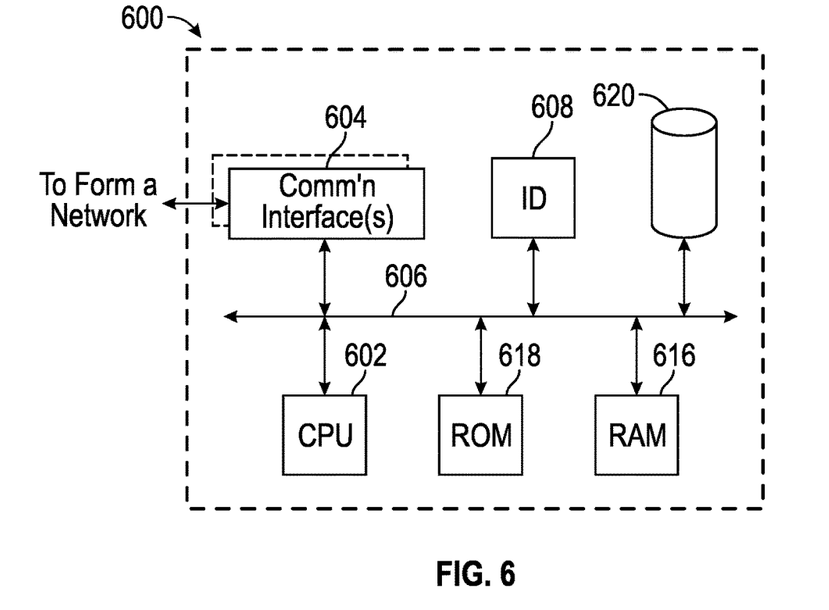
FIG. 6 is another functional block diagram illustrating a general-purpose computer hardware platform configured to implement the functional examples described with respect to FIGS. 1-4.

Aspects of the methods for stopping propeller rotation, as outlined above, may be embodied in programming in general purpose computer hardware platforms 500 and 600 (such as described above with respect to FIG. 4), e.g., in the form of software, firmware, or microcode executable by a networked computer system such as a server or gateway, and/or a programmable nodal device.

In one example, program aspects of the technology are "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may communicate through the Internet or various other telecommunication networks. Such communications, for example, may enable loading of the software, from one computer or processor (e.g., CPU 502 and CPU 602 of FIGS. 5 and 6, respectively) into another, for example, from a processor 104a-104n of the UAV 100 to a computer or software of another system (not shown). Thus, another type of media that may bear the software elements includes optical, electrical and electromagnetic waves, such as used across physical communication interface(s) 504 and 604 of FIGS. 5 and 6, respectively, between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus (e.g., 506 and 606 of FIGS. 5 and 6 respectively) within a computer system that communicates to other components of the computer system via an input/output (I/O) 508 and 608 of FIGS. 5 and 6, respectively. Carrier-wave transmission media can take the form of electric or electromagnetic signals, or acoustic or light waves such as those generated during radio frequency (RF) and light-based data communications. In one example, as shown in FIG. 5, the computer system includes a video display unit 510, (e.g., a liquid crystal display (LCD) or a cathode ray tube (CRT)), an alphanumeric input device 512 (e.g., a keyboard), a cursor control device 514 (e.g., a mouse), each of which communicate via the I/O 508.

Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM (e.g., 516 and 616 of FIGS. 5 and 6 respectively), a ROM (e.g., 518 and 618 of FIGS. 5 and 6 respectively), hard disk drive (e.g., 520 and 620 of FIGS. 5 and 6 respectively) a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine-readable medium accessible to a processor of a computer system or device, render computer system or device into a customized special-purpose machine to perform the operations specified in the program performed by processor 302 of the UAV 100.

While the foregoing has been described are considered the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They intend to have a reasonable range that is consistent with the functions to which they relate and with what is ordinary in the art to which they pertain.

The scope of protection limits solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or interpreted to cause a dedication of any component, step, feature, object, benefit, advantage, or equivalent to the public, regardless of whether it is or is not recited in the claims.

It understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it is seen that various features are grouped together in various examples to streamline the disclosure. This method of disclosure does not reflect an intention that the claimed examples require more features than are expressly recited in each claim. Rather, as the following claims reflect, the subject matter of the claims lies in less than all features of any single disclosed example. Thus, the following claims are hereby incorporated into the Detailed Description, with each claim standing on its own as a separately claimed subject matter.

While the foregoing describes what is considered to be the best mode and other examples, it is understood that various modifications may be made and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An unmanned aerial vehicle (UAV) comprising:
   a propeller assembly including a propeller;
   a housing supporting the propeller assembly, wherein the housing includes a shroud surrounding at least a portion of the propeller;
   a light detection system coupled to the housing, the light detection system including an emitter configured to emit a light beam and a detector configured to detect the light beam, wherein the emitter and the detector are positioned on the shroud and the light detection system is configured to generate a signal when the light beam is blocked; and
   a controller coupled to the propeller assembly and to the light detection system, the controller configured to detect the signal and to stop rotation of the propeller in response to the signal signifying when the light beam is blocked.

2. The UAV of claim 1, wherein the emitter is configured to emit the light beam toward the detector.

3. The UAV of claim 1, further comprising:
   a mirror;
   wherein the emitter is configured to emit a light beam toward the mirror.

4. The UAV of claim 1, wherein the emitter emits the light beam in a first direction and the light detection system further includes:
   at least one mirror configured to receive the light beam and redirect the light beam in a second direction toward the detector;
   wherein the light traveling in both the first direction and the second direction passes adjacent the propeller.

5. The UAV of claim 1, wherein the housing further includes:
   a duct surrounding the propeller, the duct having a first opening above a top surface of the propeller and a second opening below a bottom surface of the propeller.

6. The UAV of claim 5, wherein the light detection system further includes:
   another emitter configured to emit another light beam; and
   another detector configured to detect the other light beam;
   wherein the other emitter and the other detector are positioned adjacent the second openings.

7. The UAV of claim 1, wherein the emitter is configured to emit the light beam and another light beam, the detector is configured to detect the light beam, and the light detection system further includes:
  another detector configured to detect the other light beam.

8. The UAV of claim 1, further comprising:
  another propeller assembly including another propeller;
  wherein the controller is further coupled to the other propeller assembly and is further configured to stop rotation of the other propeller in response to the signal signifying when the light beams is blocked.

9. The UAV of claim 1, wherein the light beam is an infrared light beam.

10. The UAV of claim 1, wherein the light beam is an encoded light beam.

11. The UAV of claim 1, wherein the light beam has a width of at least 2 millimeters.

12. A safety method for an unmanned aerial vehicle (UAV), the UAV having a propeller assembly including a propeller and a housing including a shroud surrounding at least a portion of the propeller, the method comprising:
  emitting a light beam from an emitter on the shroud on the UAV, the light beam passing adjacent the propeller;
  detecting whether the light beam is received by a detector on the shroud of the UAV; and
  stopping rotation of the propeller of the UAV if the light beam is not received by the detector.

13. The method of claim 12, wherein the light beam is emitted from the emitter in a first direction and the method further comprises:
  redirecting the light beam in a second direction;
  wherein the light traveling in both the first direction and the second direction passes adjacent the propeller.

14. The method of claim 12, further comprising:
  encoding the light beam emitted by the emitter;
  wherein the detecting includes decoding the light beam to identify a match.

15. The method of claim 12, further comprising:
  emitting another light beam from the emitter, the other light beam passing adjacent the propeller;
  detecting whether the other light beam is received by another detector; and
  stopping rotation of the propeller of the UAV if the light beam is not received at the other detector.

16. The method of claim 12, further comprising:
  emitting another light beam from another emitter, the other light beam passing adjacent the propeller;
  detecting whether the other light beam is received by another detector; and
  stopping rotation of the propeller of the UAV if the light beam is not received by the other detector.

17. The method of claim 12, wherein the UAV includes another propeller and wherein the method further comprises:
  stopping rotation of the other propeller if the light beam is not received at the detector.

18. The method of claim 12, wherein the light beam is an infrared light beam.

19. A non-transitory computer readable medium for use with an unmanned aerial vehicle (UAV), the UAV having a light emitter, a light detector, a propeller assembly including a propeller and a housing including a shroud surrounding at least a portion of the propeller, and a controller, the non-transitory computer readable medium having stored thereon a program, wherein execution of the program of the non-transitory computer readable medium by the controller configures the UAV to:
  emit a light beam from the emitter on the shroud of the UAV, the light beam passing adjacent the propeller;
  detect whether the light beam is received by the detector on the shroud of the UAV; and
  stop rotation of the propeller of the UAV if the light beam is not received by the detector.

20. The non-transitory computer readable medium of claim 19, wherein the emitting includes encoding the light beam emitted by the emitter and the detecting includes decoding the light beam to identify a match.

* * * * *